United States Patent
Baker et al.

(10) Patent No.: US 7,940,916 B2
(45) Date of Patent: May 10, 2011

(54) ORCHESTRATION ENGINE AS AN INTERMEDIARY BETWEEN TELEPHONY FUNCTIONS AND BUSINESS PROCESSES

(75) Inventors: Albert J. Baker, Eatontown, NJ (US); Scott Allan Schell, Westminster, CO (US); Frederick Peter Block, Westminster, CO (US); Janis R. Putman, Hillsborough, NJ (US); David Butler, Glen Gardner, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1290 days.

(21) Appl. No.: 11/467,889

(22) Filed: Aug. 28, 2006

(65) Prior Publication Data
US 2008/0065498 A1    Mar. 13, 2008

(51) Int. Cl.
*H04M 3/00* (2006.01)
(52) U.S. Cl. .................... 379/265.09; 719/329
(58) Field of Classification Search ............ 379/265.09, 379/202.01; 719/329; 705/8
See application file for complete search history.

(56) References Cited

U.S. PATENT DOCUMENTS

| | | | |
|---|---|---|---|
| 2003/0169730 A1* | 9/2003 | Narasimhan et al. | 370/355 |
| 2004/0028212 A1 | 2/2004 | Lok et al. | |
| 2004/0078373 A1 | 4/2004 | Ghoneimy et al. | |
| 2004/0187127 A1 | 9/2004 | Gondi et al. | |
| 2005/0138634 A1* | 6/2005 | Luty et al. | 719/315 |
| 2005/0256732 A1* | 11/2005 | Bauer et al. | 705/1 |
| 2006/0074732 A1 | 4/2006 | Shukla et al. | |
| 2007/0011126 A1* | 1/2007 | Conner et al. | 706/47 |
| 2007/0260575 A1* | 11/2007 | Robinson et al. | 707/1 |

* cited by examiner

*Primary Examiner* — William J Deane
(74) *Attorney, Agent, or Firm* — DeMont & Breyer, LLC (57) ABSTRACT

A technique is disclosed for interfacing business processes with telephony functions. Particularly, an orchestration engine is interposed between a business process engine that executes business processes and an enterprise telecommunications network that executes telephony functions. Acting as an intermediary between the business process engine and the telecommunications network, the orchestration engine decouples the atomic telephony functions that are required for a business application from the business logic that is used in features that comprise one or more business processes. Thus, a new protocol state, feature, or algorithm change is isolated to a single and easy-to-develop location in software.

17 Claims, 5 Drawing Sheets

ORCHESTRATION ENGINE AS AN INTERMEDIARY BETWEEN TELEPHONY FUNCTIONS AND BUSINESS PROCESSES

FIELD OF THE INVENTION

The present invention relates to telecommunications in general, and, more particularly, to decoupling telephony functions from underlying, associated business processes, and to interfacing those telephony functions and business processes with each other.

BACKGROUND OF THE INVENTION

Figure 1:
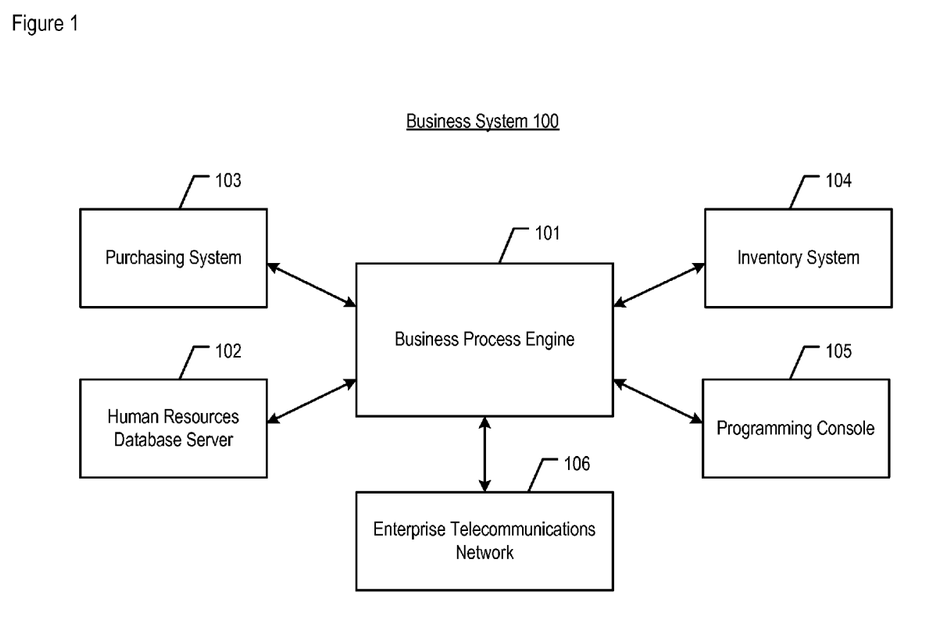
FIG. 1 depicts business system 100 in the prior art.

FIG. 1 depicts business system 100 in the prior art. Business system 100 implements one or more business processes, such as a purchasing process. System 100 comprises business process engine 101, human resources database server 102, purchasing system 103, inventory system 104, terminal 105, and enterprise telecommunications system 106, interconnected as shown.

Business process engine 101 is a data-processing system that executes one or more workflow scripts that are written in the business process execution language, or "BPEL." BPEL represents information such as when to wait for messages, when to send messages, when to compensate for a failed transaction as part of an "exception condition," and so forth. This information is programmed by a business consultant through programming console 105 at installation time when the consultant sets up the related business application.

During run-time of a business application that comprises, for example, a purchasing process, engine 101 accepts purchasing transactions from purchasing system 103. When a purchaser fills out a purchase order for an item via purchasing system 103, engine 101 runs a workflow that is associated with the purchasing process. The workflow, among other things, determines whether the item is in stock or not. If the item is in stock, the purchasing process proceeds normally. If the item is not in stock, however, the workflow triggers an exception condition that needs to be corrected. The exception condition might result in inventory system 104 being contacted to determine how to correct the out-of-stock problem; system 104, in turn, identifies the various business roles that need to be consulted, such as inventory management and account management, and provides those roles back to engine 101. Engine 101 then determines the people to contact by consulting with human resources database server 102 and subsequently triggers enterprise telecommunications system 106 to transmit email to the affected parties, such as the person in charge of re-ordering the out-of-stock item, the account executive of the customer who attempted to order the item, and so forth. Alternatively, those affected parties might be contacted by telephone through the use of one or more telephony functions.

The integration of business processes with telephony functions, however, has often been anything but straightforward. For example, one of the key problems with any telephony-based application is the cost of feature development. As the time to develop a feature increases, so does the cost of the feature. Furthermore, the more features that are to be offered in a system, the more protocols the associated application must understand. The cost can grow exponentially as a function of the number of features or protocols present.

Additionally, once the base telephony infrastructure is in place and telephone calls can be made, the customer will often want to add applications to the platform. Often, these applications, such as the purchasing process described earlier, require customized behavior in the system, in which the customization might have to change from time to time. This can be difficult to achieve given the breadth of features, communication protocols, and application program interfaces that are available in modern telephony systems.

What is needed is a technique for interfacing business processes with telephony functions, without some of the disadvantages in the prior art.

SUMMARY OF THE INVENTION

The present invention enables the interfacing of business processes with telephony functions, without some of the disadvantages in the prior art. Particularly, in accordance with the illustrative embodiment of the present invention, an orchestration engine is interposed between a business process engine that executes business processes and an enterprise telecommunications network that executes telephony functions. Acting as an intermediary between the business process engine and the telecommunications network, the orchestration engine decouples, from a software design perspective, the atomic telephony functions that are required for a business application from the business logic that is used in features that comprise one or more business processes. Thus, a new protocol state, feature, or algorithm change is isolated to a single and easy-to-develop location in the software.

In accordance with the illustrative embodiment, a workflow-processing system comprises one or more orchestration engines that execute their own workflow scripts. In addition to the orchestration engines, the workflow-processing system further comprises (i) a proxy that assigns work to the orchestration engines and (ii) communication adapters that accept requests from the business processes and output the messages that control the telephony functions within the telecommunications network. The distributed nature of the workflow-processing engine—that is, between the proxy, orchestration engines, and communication adapters—allows additional adapters to be deployed into the system in the future without having to change any of the software that binds an adapter to an orchestration engine.

Although the orchestration engines, communication adapters, message bus, and proxy are described in the illustrative embodiment as being software components, in some alternative embodiments one or more of the described components can, in fact, be hardware components. For example, the orchestration engines might be software modules that execute on a single, first processor; each communication adapter might be a dedicated hardware device with software or firmware specific to the adapter; the message bus might be a hardware bus; and the proxy might be yet another software component on the first processor, a software component on a separate, second processor, or itself a physically-distinct hardware device.

The illustrative embodiment of the present invention comprises: a first communication adapter for receiving a first message that comprises information related to a first business process; a second communication adapter for transmitting a second message that comprises information related to a first telephony function; and a processor for executing an orchestration engine that determines the second message based on the first message; wherein the first telephony function is decoupled from the first business process via said orchestration engine.

DETAILED DESCRIPTION

Figure 2:
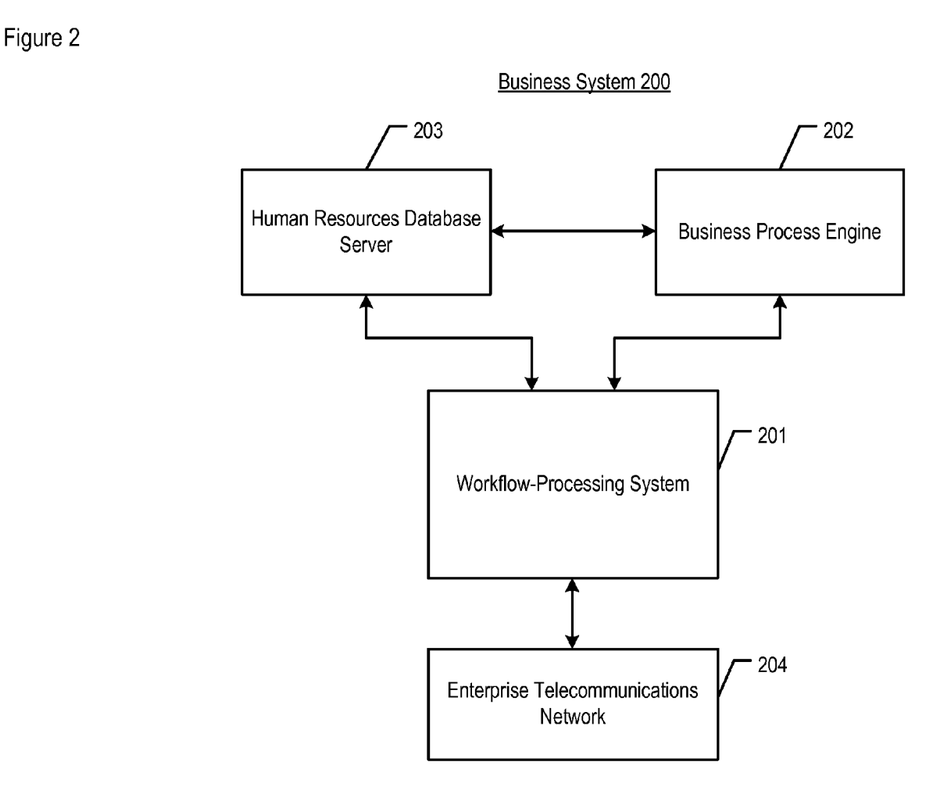
FIG. 2 depicts business system 200, in accordance with the illustrative embodiment of the present invention.

FIG. 2 depicts business system 200, in accordance with the illustrative embodiment of the present invention. System 200 comprises workflow-processing system 201, business process engine 202, human resources database server 203, and enterprise telecommunications network 204, interconnected as shown.

Workflow-processing system 201 is a server data-processing system that receives business process-related information and processes workflows based on the received information. System 201 is depicted in additional detail below and with respect to FIG. 3. In accordance with the illustrative embodiment, system 201 is a finite state machine, as is known in the art, where the states and transitions are described in a non-hardcoded format, such as in the Extensible Markup Language (XML). System 201 controls the states of communication adapters (described below) that adapt to different communication protocols for the purpose of providing access to different devices and network services. Such devices include business process engine 202, human resources database server 203, and enterprise telecommunications network 204. In the illustrative embodiment, system 201 communicates packets of information with the other devices in accordance with the Internet Protocol, in combination with specialized, high-layer protocols described below. In some alternative embodiments, as those who are skilled in the art will appreciate, system 201 can operate in accordance with a different set of protocols and process workflows that are described in a language other than XML.

Workflow-processing system 201 is depicted as a single data-processing system that comprises all of the components as described below and with respect to FIG. 3. As those who are skilled in the art will appreciate, in some alternative embodiments, some all or of the components can be situated in standalone units, such as servers, which are connected together via a network.

When the triggering information is received that is related to a business process—for example, information received from business process engine 202—workflow-processing system 201 assigns the workflow related to the received information to an orchestration engine, described below and with respect to FIG. 3. The assigned orchestration engine executes the workflow based on the state accumulated in the communication adapter that received the triggering information, including any existing state that might have been accumulated through a session. During the execution of the workflow, the engine determines one or more telephony functions from the information received from one or more sources that are associated with business processes and user information. The details of the workflow assignment and execution process are described below and with respect to FIGS. 4 and 5. As those who are skilled in the art will appreciate, the functionality described in this specification with respect to workflow-processing system 201 can alternatively be implemented in a data-processing system that is other than a server. In any event, it will be clear to those who are skilled in the art, after reading this specification, how to make and use workflow-processing system 201.

Business process engine 202, being similar to engine 101 described earlier, is a data-processing system that executes one or more business processes, such as a purchasing process, in support of a business application. Engine 202 executes workflow scripts that are written in the business process execution language (BPEL), as is known in the art. In some alternative embodiments, engine 202 executes workflow scripts that are written in a different type of language. Similar to engine 101, engine 202 is able to communicate with other devices, such as a business analyst's workstation, an email system, an inventory control system, a purchasing system, and a human resource database server (i.e., server 203, as depicted), in addition to workflow-processing system 201. Engine 202 communicates with workflow-processing system 201 via the Simple Object Access Protocol (or "SOAP"), as is known in the art. In some alternative embodiments, engine 202 communicates with system 201 via a different protocol. In any event, it will be clear to those skilled in the art how to make and use business process engine 202.

Human resources database server 203 is a data-processing system that fulfills database access requests from its users, which are workflow-processing system 201 and business process engine 202 in the illustrative embodiment. Database server 203 is capable of acquiring and maintaining information about the users—including subject matter experts—of business system 200, such as the names, roles, and contact information of those users, in well-known fashion. Database server 203 communicates with workflow-processing system 201 via the Lightweight Directory Access Protocol (or "LDAP"), as is known in the art. In some alternative embodiments, server 203 communicates with system 201 via a different protocol. Although FIG. 2 depicts a single database server, those who are skilled in the art will appreciate how to make and use the present invention with more than one database server present. In any event, it will be clear to those skilled in the art how to make and use human resources database server 203.

Enterprise telecommunications network 204 is a Session Initiation Protocol-based (SIP-based) telecommunications network that comprises an interactive voice response system (IVR), a private branch exchange (PBX), a conference bridge, and telecommunications endpoints, along with connectivity to one or more of the Internet, the Public Switched Telephone Network (PSTN), a local area network (LAN), and so forth. Network 204 is capable of handling, in well-known fashion, Internet Protocol-based messages that are transmitted among two or more Internet Protocol-capable processing systems. In some alternative embodiments, network 204 operates in accordance with a set of protocols that are different from or in addition to the Session Initiation Protocol and the Internet Protocol. By executing one or more telephony functions, network 204 is capable of bridging two or more users together with its conferencing capabilities. Network 204 is also capable of calling a user and then exchanging information with that user by means of the network's interactive voice response system. It will be clear to those skilled in the art how to make and use enterprise telecommunications network 204.

Figure 3:
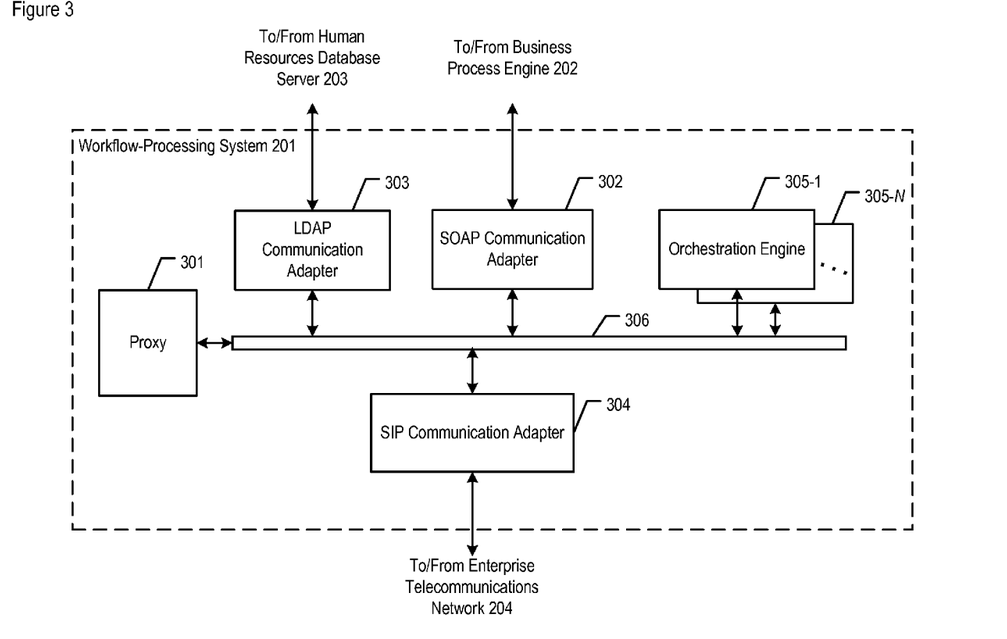
FIG. 3 depicts the salient components of workflow-processing system 201 in accordance with the illustrative embodiment of the present invention.

FIG. 3 depicts the salient software components of workflow-processing system 201 in accordance with the illustrative embodiment of the present invention. System 201 comprises: proxy 301; SOAP communication adapter 302; LDAP communication adapter 303; SIP communication adapter 304; orchestration engine 305-1 through 305-N, wherein N is a positive integer; and message bus 306, interrelated as shown. Although proxy 301, adapters 302 through 304, orchestration engines 305-1 through 305-N, and message bus 306 in the illustrative embodiment are software components, in some alternative embodiments one or more of these components can, in fact, be hardware components, as those who are skilled in the art will appreciate.

The distributed infrastructure of system 201 comprises proxy 301, which is responsible for abstracting the bindings between communication adapters 302 through 304 and orchestration engines 305-1 through 305-N. The abstracting enables the adapters and orchestration engines to be added to or removed from system 201 dynamically at run-time. Proxy 301 routes a received request (i.e., from business process engine 202) for a telephony function to the appropriate communication adapter or orchestration engine, based on metadata criteria expressed by the state in the received request. For example, if the request was from a SIP endpoint to another SIP endpoint, then one part of the metadata would specify that the response must go to a communication adapter that supports SIP, such as adapter 304. A stricter part of the metadata might even narrow the criteria for adapter or orchestration engine selection down further to the specific adapter that made the request. One effect of proxy 301 being present is to allow additional adapters to be deployed into system 201 without having to change any of the code that binds an adapter to an orchestration engine.

Proxy 301 is capable of exchanging messages with another element of system 201 via message bus 306 and of executing the tasks described below and with respect to FIGS. 4 and 5. In some alternative embodiments of the present invention, proxy 301 might itself be a hardware processor or a function in a hardware processor that is separate from one or more of the other described components. In any event, it will be clear to those skilled in the art, after reading this specification, how to make and use proxy 301.

Communication adapters 302 through 304 receive signals from other nodes external to workflow-processing system 201 and forward, via message bus 306, the information encoded in those signals to proxy 301. In addition, adapters 302 through 304 receive information from proxy 301 via message bus 306 and send signals that encode the information to other nodes that are external to system 201. Each communication adapter is capable of communicating with an external node via a specific protocol. In particular, adapter 302 communicates with business process engine 202 via SOAP, adapter 303 communicates with human resources database 203 via LDAP, and adapter 304 communicates with telecommunications network 204 via SIP, all in well-known fashion. In some alternative embodiments of the present invention, each communication adapter might itself be a hardware processor or a function in a hardware processor that is separate from one or more of the other described components. In any event, it will be clear to those skilled in the art, after reading this specification, how to make and use communication adapters 302 through 304.

Orchestration engine 305-n, wherein n can have a value between 1 and N, inclusive, is capable of receiving information from proxy 301, executing the tasks described below and with respect to FIGS. 4 and 5, and sending information to proxy 301. In some alternative embodiments of the present invention, the N orchestration engines might be distributed across more than one hardware processor. In some other alternative embodiments, each orchestration engine might itself be a hardware processor or a function in a hardware processor that is separate from one or more of the other described components. In any event, it will be clear to those skilled in the art, after reading this specification, how to make and use orchestration engine 305-n.

Message bus 306 connects the other components of system 201 together. In particular, bus 306 enables the transmission of messages between proxy 301, adapters 302 through 304, and orchestration engines 305-1 through 305-N, in well-known fashion. In some embodiments, including the illustrative embodiment, bus 306 is based on the Java Message Service (JMS), as is known in the art. In some alternative embodiments, bus 306 is instead a hardwire circuit that connects the different hardware components (e.g., a processor that executes an orchestration engine, a hardware communication adapter, etc.). In any event, it will be clear to those skilled in the art, after reading this specification, how to make and use message bus 306.

Figure 4:
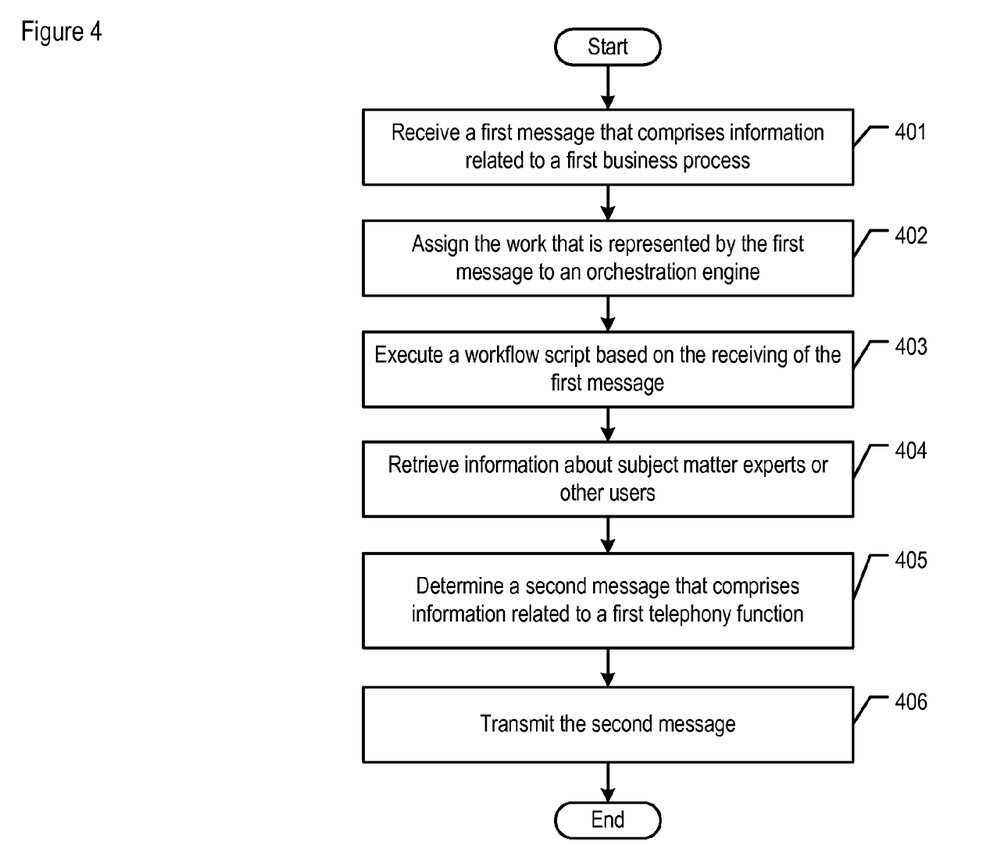
FIG. 4 depicts a flowchart diagram of the salient tasks performed by workflow-processing system 201, in accordance with the illustrative embodiment of the present invention.

FIG. 4 depicts a flowchart diagram of the salient tasks performed by workflow-processing system 201, in accordance with the illustrative embodiment of the present invention. As those who are skilled in the art will appreciate, some of the events that appear in FIG. 4 can occur in parallel or in a different order than that depicted.

At task 401, system 201 receives a first message that comprises information related to a first business process or a request for resources that are to be applied to the business process. For example, the information could be the results of an exception condition encountered by business process engine 202, in which the intervention of a subject matter expert that fills a needed role, or some other user of system 201, is required.

At task 402, system 201 assigns the work to be done in response to the first message to orchestration engine 305-n.

At task 403, based on the contents of the first message, system 201 executes a workflow script in orchestration engine 305-n.

At task 404, based on the execution of the workflow script, system 201 retrieves information on one or more subject matter experts from human resources database server 203. For example, system 201 might transmit information about a role that is being relied on to resolve the encountered business process exception, and might then receive, from server 203, the contact information of one or more subject matter experts who can fulfill that role.

At task 405, based on one or more of the first message, the workflow script, and the retrieved subject matter expert information, system 201 determines a second message that comprises information related to a first telephony function. For example, the first telephony function might be to conference together the identified subject matter experts to resolve the business process exception, where the retrieved contact information is used to conference in the individuals.

At task 406, system 201 transmits the second message, as well as possibly other messages, to enterprise telecommunications network 204 for the purpose of invoking telephony functions for the business process in execution.

Figure 5:
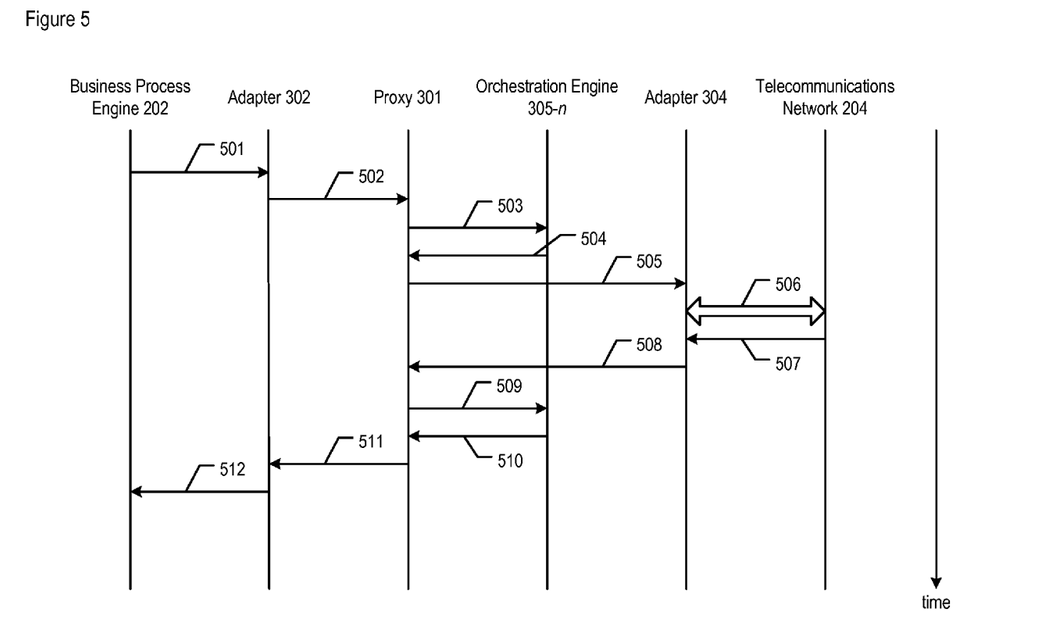
FIG. 5 depicts a message flow diagram of the salient messages exchanged within workflow-processing system 201, in accordance with the illustrative embodiment of the present invention.

FIG. 5 depicts a message flow diagram of the salient messages exchanged within workflow-processing system 201 in contacting one or more users, in accordance with the illustrative embodiment of the present invention. As those who are skilled in the art will appreciate, some of the events that are described with respect to FIG. 5 can occur in parallel or in a different order than that depicted.

The example illustrated in FIG. 5 is of a "click-to-call" application. In the example, a business process exception has occurred in business process engine 202, which has resulted in the business application user (e.g., on the purchasing system, etc.) first being presented with a click-to-call web browser page, followed by engine 202 receiving the click-to-call information from the browser application. At this point, the click-to-call information does not indicate the specific subject matter expert or experts that are needed to resolve the process exception. The web-based service for click-to-call includes the functionality of "click-to-dial," which is used to call a single party, and of "click-to-conference," which is used to call multiple parties. If the number of parties to be called is one, click-to-call can be handled as a click-to-dial telephony function, and the call can be created as a two-party call using a SIP third-party call control mechanism. If the number of parties to be called is two or more, click-to-call can be handled as a click-to-conference function, and all involved parties are added to an ad hoc conference. Both cases follow the same general flow, as depicted in FIG. 5. In both cases, network 204 will be relied on to execute the appropriate telephony function.

First, the application in business process engine 202 that received the click-to-call information (i.e., from the web browser) transmits message 501, a click-to-call SOAP request, to the SOAP routing function in communication adapter 302. Adapter 302 accepts the incoming request and repackages the request as message 502 with the request type in the Resource Description Framework (RDF) routing field in the JMS header field, as are known in the art, and the request body in the JMS message body.

Adapter 302 transmits message 502 to proxy 301, which finds an available orchestration engine—in this example, engine 305-1—to handle the contents of message 502. Adapter 302 finds the particular orchestration engine based on an RDF match.

Proxy 301 transmits message 503, which comprises the relevant contents of message 502, to selected orchestration engine 305-1.

Orchestration engine 305-1 receives message 503, extracts the message's contents, and executes local logic to reformat the message into a form understandable by the intended registered service—in this case, a SIP user agent that executes in SIP communications adapter 304. In the case of click-to-call, the executed workflow might take different actions for a single-party click-to-dial versus a multi-party click-to-conference. Some of those actions might comprise retrieving contact information from human resources database server 203 via adapter 303. Engine 305-1 then transmits message 504 to proxy 301 with the appropriate RDF in the JMS header for routing.

Proxy 301 receives message 504 and finds a registered service, the business-to-business user agent at adapter 304, to handle the message's contents. Proxy 301 transmits the contents as part of message 505 to adapter 304.

The SIP business-to-business user agent at adapter 304 receives message 505 and engages in a SIP dialog with the parties being joined, as shown by message transaction 506.

As part of that SIP transaction, one of the parties' endpoints (i.e., the originator's endpoint) transmits a SIP 200 OK, which is depicted as message 507 and which indicates that the originator is involved in the call.

The response then propagates back through proxy 301, through orchestration engine 305-1, through proxy 301 again, and back to SOAP communication adapter 302, via messages 508 through 511. The SOAP routing function at adapter 302 is logically stateful and is logically blocking on the response to the synchronous client request. The SOAP routing function receives the response and correlates the session identifier with a local session.

The SOAP routing function then transmits the response to the client in business process engine 202 via message 512.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   a first communication adapter for receiving a first message that comprises a first set of information related to a business process;
   a second communication adapter for transmitting a second message that comprises a second set of information related to a telephony function; and
   a processor for executing an orchestration engine that executes a workflow script based on control state information that is accumulated by the first communication adapter;
   wherein the workflow script determines, based on the first set of information that is in the first message, the second set of information for transmitting as part of the second message; and
   wherein the orchestration engine is designed to decouple the telephony function from software logic of product features that comprise the business process.

2. The apparatus of claim 1 wherein the business process comprises a click-to-call request.

3. The apparatus of claim 2 further comprising a third communication adapter for receiving a third message that comprises information about at least one subject matter expert.

4. The apparatus of claim 3 wherein the second message is also based on the third message.

5. The apparatus of claim 1 wherein the first communication adapter operates in accordance with the Simple Object Access Protocol and the second communication adapter operates in accordance with the Session Initiation Protocol.

6. A method comprising:
- receiving, by a communication adapter, a first message that comprises a first set of information related to a business process;
- executing a workflow script based on the receiving of the first message and on control state information that is accumulated by the communication adapter;
- determining a second message that comprises a second set of information related to a telephony function, wherein the workflow script determines, based on the first set of information that is received in the first message, the second set of information; and
- transmitting the second message.

7. The method of claim 6 wherein the business process comprises a click-to-call request.

8. The method of claim 7 further comprising receiving a third message that comprises information about at least one subject matter expert.

9. The method of claim 8 wherein the second message is also based on the third message.

10. The method of claim 6 wherein the receiving of the first message occurs in accordance with the Simple Object Access Protocol and the transmitting of the second message occurs in accordance with the Session Initiation Protocol.

11. An apparatus comprising:
- a first communication adapter for receiving a first message that comprises information related to a business process;
- a plurality of additional communication adapters for transmitting a second message that comprises information related to a telephony function;
- a proxy for assigning a function that is related to the business process to an orchestration engine that determines the second message based on the first message, wherein the proxy selects i) the orchestration engine based on metadata expressed in the first message or ii) a second communication adapter from the plurality based on metadata expressed in the first message, or both; and
- a processor for executing the orchestration engine;
- wherein the orchestration engine is designed to decouple the telephony function from software logic of product features that comprise the business process.

12. The apparatus of claim 11 wherein the orchestration engine executes a workflow script.

13. The apparatus of claim 12 wherein the second message is also based on the workflow script and the control state of the first communication adapter.

14. The apparatus of claim 11 wherein the function that is related to the business process comprises a click-to-call request.

15. The apparatus of claim 14 further comprising a third communication adapter for receiving a third message that comprises information about at least one subject matter expert.

16. The apparatus of claim 15 wherein the second message is also based on the third message.

17. The apparatus of claim 11 wherein the first communication adapter operates in accordance with the Simple Object Access Protocol and the second communication adapter operates in accordance with the Session Initiation Protocol.

* * * * *